United States Patent
Geslain

(10) Patent No.: US 11,448,255 B2
(45) Date of Patent: Sep. 20, 2022

(54) SUSPENSION BEARING RING FOR A MOTOR VEHICLE COMPRISING A FUSE PORTION

(71) Applicant: Vibracoustic Nantes SAS, Carquefou (FR)

(72) Inventor: Antoine Geslain, Nantes (FR)

(73) Assignee: Vibracoustic Nantes SAS, Carquefou (FR)

( * ) Notice: Subject to any disclaimer, the term of this patent is extended or adjusted under 35 U.S.C. 154(b) by 474 days.

(21) Appl. No.: 16/690,754

(22) Filed: Nov. 21, 2019

(65) Prior Publication Data
US 2020/0166074 A1 May 28, 2020

(30) Foreign Application Priority Data
Nov. 23, 2018 (FR) ...................................... 1871783

(51) Int. Cl.
*F16C 17/02* (2006.01)
*B60G 7/00* (2006.01)

(52) U.S. Cl.
CPC ............... *F16C 17/02* (2013.01); *B60G 7/00* (2013.01); *B60G 2204/418* (2013.01); *F16C 2326/05* (2013.01)

(58) Field of Classification Search
CPC .... F16C 17/02; F16C 2326/05; F16C 11/045; F16C 27/02; F16C 33/06; B60G 7/00; B60G 2204/418; B60G 7/02
See application file for complete search history.

(56) References Cited

U.S. PATENT DOCUMENTS

| | | | | |
|---|---|---|---|---|
| 5,531,524 A | * | 7/1996 | Brouwer | ................. F16C 17/10 384/220 |
| 5,620,261 A | | 4/1997 | Salz | |
| 6,007,072 A | | 12/1999 | Yoon | |
| 6,334,615 B1 | * | 1/2002 | Uchiyama | ........... B29C 45/1676 277/944 |

(Continued)

FOREIGN PATENT DOCUMENTS

| CN | 101448651 A | 6/2009 |
|---|---|---|
| CN | 104125911 A | 10/2014 |

(Continued)

OTHER PUBLICATIONS

Chinese Search Report, 201911154532X, dated Jan. 6, 2021.

*Primary Examiner* — Darlene P Condra
(74) *Attorney, Agent, or Firm* — Fishman Stewart PLLC

(57) ABSTRACT

A suspension bearing ring suitable for a motor vehicle suspension includes: an outer part, an inner part, and an elastomeric body. In embodiments, the elastomeric body connects the inner part and the outer part, and the inner part includes an inner portion, an outer portion, and at least one connection device. Further, in embodiments, the inner portion extends axially into a space by being coupled to the outer portion via the connection device. In embodiments, the connection device includes a fuse portion that is configured to break when the ring is subjected to a predetermined force, and in which a clearance is provided between the inner portion and the outer portion such that the inner portion can move in relation to the outer portion when the fuse portion is broken.

10 Claims, 3 Drawing Sheets

(56) References Cited

U.S. PATENT DOCUMENTS

| | | | |
|---|---|---|---|
| 7,220,056 B2* | 5/2007 | Kubota | F16C 33/20 |
| | | | 384/220 |
| 7,325,796 B2 | 2/2008 | Moreland | |
| 9,145,160 B2* | 9/2015 | Domig | B62D 1/16 |
| 2003/0001324 A1 | 1/2003 | Hettler | |
| 2010/0014798 A1 | 1/2010 | Fischer et al. | |
| 2012/0204638 A1* | 8/2012 | Kakuda | F16C 41/007 |
| | | | 73/494 |
| 2015/0246689 A1 | 9/2015 | Kommayer et al. | |
| 2019/0017635 A1* | 1/2019 | Belen | F16L 21/005 |

FOREIGN PATENT DOCUMENTS

| | | |
|---|---|---|
| EP | 1013961 A2 | 6/2000 |
| EP | 1998068 A2 | 12/2008 |
| JP | H10-138725 A | 5/1998 |
| JP | 2013-76440 A | 4/2013 |
| JP | 2013-170585 A | 9/2013 |

* cited by examiner

SUSPENSION BEARING RING FOR A MOTOR VEHICLE COMPRISING A FUSE PORTION

CROSS-REFERENCE TO RELATED APPLICATION

This application claims the benefit of French Patent Application Serial No. 1871783, filed on Nov. 23, 2018, the disclosure of which is hereby incorporated by reference in its entirety as though fully set forth herein.

TECHNICAL FIELD

The present disclosure generally relates to a suspension bearing ring, including a suspension bearing ring that may, for example and without limitation, be used in connection with a motor vehicle, such as a car.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

A motor vehicle suspension can be subjected to significant forces or stresses, notably during a vehicle accident. Aiming at avoiding undesirable residual deformations within the suspension, or even on the vehicle body, which are sometimes not detected by the user and are thus potentially very dangerous, different suspension structures are known. Nevertheless, these structures do not always provide full satisfaction, notably from the point of view of their reliability and their manufacturing/installation reproducibility. Indeed, their effectiveness can depend on the assembly conditions a fact which generates an uncontrollable risk for the manufacturer of the different components of the suspension.

There is a desire for solutions/options that minimize or eliminate one or more challenges or shortcomings of suspension bearing rings. The foregoing discussion is intended only to illustrate examples of the present field and is not a disavowal of scope.

SUMMARY

One embodiment concerns a suspension bearing ring for a motor vehicle suspension, preferably for a car, comprising an external part, an internal part, an elastomeric body connecting the inner and outer parts, in which the inner part includes an inner portion, an outer portion and at least one connection device, the inner portion comprising a through hole extending in an axial direction and configured to receive a bolt or equivalent, the outer portion delimiting a space extending in the axial direction, the inner portion extending axially wholly or partially into the space by being coupled to the inner portion through the at least one connection device in which the at least one connection device comprises a fuse portion configured to break when the ring is subjected to a predetermined force or stress and in which a clearance is arranged between the inner portion and the outer portion in such a way that the inner portion can move in relation to the outer portion when the fuse portion is broken.

In general, the axial direction corresponds to the direction of the axis of the ring and a radial direction is a direction perpendicular to the axial direction. The azimuthal direction corresponds to the direction describing a ring around the axial direction. The three directions axial, radial and azimuthal correspond respectively to the directions defined by the slope, the radius, and the angle in a cylindrical system of coordinates.

By bolt or equivalent every bolt, screw, stem threaded or not, etc. being able to extend into the ring to achieve the pivot link desired within a suspension bearing is understood.

It is understood that the outer part is coupled to the inner part via the elastomeric body. For example, the elastomeric body cooperates with the outer portion of the inner part, but not necessarily. For example, the elastomeric body is vulcanized on each of the two parts.

The inner part can comprise one or more connection devices. Subsequently, and unless otherwise stated, by "the connection device" the "at least one connection device" is understood. The fuse portion may be understood as a sacrificial portion.

The inner portion of the outer part and the outer portion of the inner part are coupled, for example in all degrees of freedom, via the connection device. Thanks to the fuse portion, when the ring is subjected to a predetermined force, for example during a crash involving the vehicle on which it is mounted, the fuse portion breaks. This enables the preservation of the other structural elements of the vehicle, preferably the suspension or the body. The fuse portion being an element of the structure of the ring that permits coupling the inner portion to the outer portion, it is manufactured in series with the inner and outer portions. This makes it possible to ensure the reproducibility of the fuse portion, and thus to control the value of the predetermined force over the entire production process. In other words, this fuse portion makes it possible to be freed from external constraints, such as constraints of the assembly of the ring within a suspension and/or a vehicle (e.g. bolt tightening torque, tolerances, play, etc. to be observed), that have an influence on the behavior of the state-of-the-art rings. On the other hand, with the inner portion being located in the outer portion (e.g., in the space defined by the outer portion), when the fuse portion is broken, the two inner and outer portions remain engaged in each other, thanks to which the overall structure of the suspension remains ensured. Thanks to the clearance between the inner portion and the outer portion, when the fuse portion is broken it is immediately detected that the fuse portion is broken and that an intervention to replace the ring is necessary. Safety is hence improved.

In certain embodiments, the inner part comprises two diametrically opposed connection devices, each connection device comprising one fuse portion.

It is understood that the inner and outer parts each have a generally annular geometry extending in the axial direction. The two connection devices extend radially within this annular geometry. Such a configuration is easy to manufacture, reliable, and provides satisfactory support while being easy to break, in particular in the case of forces orientated perpendicular to the axial direction and to the orientation of the connection devices (e.g., for forces orientated radially at 90° from the connection devices).

In certain embodiments, the inner part is formed by one single element or one unitary element.

In other words, the outer portion, the inner portion, and the connection device are all formed by one single/unitary part. Such a configuration makes it possible to make it easier to assemble the ring by reducing the number of the parts to be assembled.

In certain embodiments, the inner portion and the outer portion are separate and distinct elements.

In other words, to form the inner part, the inner portion must be assembled with the outer portion, and they must be coupled together via the connection device. Such a configuration makes it possible to choose different materials for the inner portion and the outer portion in order to optimize the behavior of the ring and/or the methods/cost of production.

In certain embodiments, the at least one connection device comprises an axial rib and an axial groove, an element between the inner portion and the outer portion being provided with the rib while the other element between the inner and the outer portion is provided with the groove, with the rib being engaged in the groove, and with the rib and/or the groove forming the fuse portion.

Hence, to assemble the inner portion together with the outer portion, the inner portion is engaged in the space defined by the outer portion, by engaging, for example by force, for example with the help of a press, the rib in the groove. Such a configuration is simple and effective, and preferably makes it possible to perfectly control the predetermined force via the dimensions, shapes, and materials of the rib and of the walls of the groove.

In certain embodiments, the predetermined force is orientated perpendicular to the axial direction.

The ring and the fuse portion are particularly suited to such forces.

In certain embodiments, the at least one connection device extends radially and perpendicular to the orientation of the predetermined force.

In other words, the predetermined force and the connection device, for example the groove/rib, are orientated at 90° in relation to each other. This makes it possible for the connection device to perfectly transmit the gravity-related forces/loads, and to easily break in the event of forces perpendicular to gravity commonly encountered in accidents. In other words, such a configuration is particularly well suited to a function where the force is orientated at 90° but the fuse function remains functional for a different angle, as long as an adequate component of the force applied is perpendicular to the connection device. The control of the behavior of the fuse portion is hence improved when the ring is subjected to the predetermined effort.

In certain embodiments, the clearance is radial and perpendicular to the connection device.

In other words, the maximum clearance and the connection device are orientated at 90° to each other. This makes breakage of the fuse portion easier when the predetermined force is orientated perpendicular to the direction of the connection device (e.g., substantially parallel to the clearance), and enables the user to easily see that the fuse portion is broken and it is necessary to replace the ring.

In certain embodiments, the inner portion and/or the outer portion are made of aluminum or of steel.

Such materials are particularly suited to the manufacture of the inner and outer portions. For example, the inner portion is made of steel and the outer portion is made of aluminum, a fact which makes it possible to withstand a high tightening tension of the ring while maintaining an acceptable predetermined force.

In certain embodiments, the inner portion and/or the outer portion are extruded.

Such extruded portions are particularly suited to the manufacture of the ring.

One embodiment also concerns a suspension arm equipped with at least one suspension bearing ring according to any of the embodiments described in the present disclosure.

The foregoing and other potential aspects, features, details, utilities, and/or advantages of examples/embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Figure 1A:
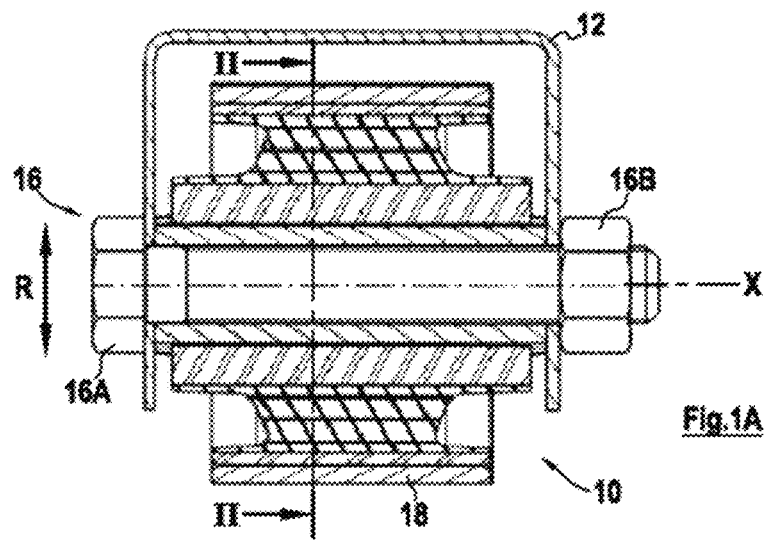
FIG. 1A shows a cross-sectional view of a suspension bearing for a motor vehicle according to a first embodiment.

A first embodiment of a suspension bearing ring 10 for a motor vehicle is described with reference to FIGS. 1A to 1C. In FIG. 1A, ring 10 is mounted on a clevis 12 forming part of a vehicle body, via a bolt 16 comprising a screw 16A and a nut 16B.

Ring 10 will now be described in more detail with reference to FIGS. 1B and 1C. Ring 10 extends in an axial direction X, in a radial direction R, and in an azimuthal direction C. The ring has an outer part 18, an inner part 20 and an elastomeric body 22 linking the outer part 18 and the inner part 20. The inner part 20 comprises an outer portion 20A, an inner portion 20B, and two connection devices 20C coupling the outer portion 20A and the inner portion 20B. Inner part 20 is received into outer part 18. The inner portion 20B is taken up by the outer portion 20A. In this example, inner part 20 extends over the whole axial length of outer part 18 and passes by on either side of outer part 18 in the axial direction X, in a symmetrical manner. In this example, the inner portion 20B extends over the entire axial length of outer portion 20A, and passes by on either side of the outer portion 20A in axial direction X, in a symmetrical manner. In other words, in this example, the axial length of the inner part 20 is greater than the axial length of outer part 18, and the axial length of inner portion 20B is greater than the axial length of the outer portion 20A.

More particularly in this example, the outer part 18 is a cylinder with a circular cross-section, for example made of extruded aluminum, but not necessarily. The outer portion 20A is a cylindrical profile, for example made of extruded aluminum, but not necessarily, with a generally circular cross-section, its outer surface being of a circular cross-section and its inner surface being of a cross-section noticeably of a truncated elliptical shape. The elastomeric body 22 is made of elastomeric material, and it elastically connects the outer part 18 to inner part 20. The elastomeric body 22 provides ring 10 with damping behavior. In this example, the elastomeric body 22 shows a generally annular shape and extends between the outer surface of outer portion 20A and inner surface of the outer part 18. The outer portion 20A delimits a space E extending axially and receiving the inner portion 20B in part.

The inner portion 20B is a cylindrical profile made of extruded steel or steel made by cold stamping. Such a portion 20B made of steel provides the advantage of being able to increase its durability and its rigidity so that high bolt tensions can be applied to it. The inner portion 20B shows a generally circular cross-section, its inner surface being of a circular cross-section and forming a through hole 21 that extends in the axial direction X. The bolt 16 is inserted in the through hole 21 of the inner portion 20B. The through hole 21 may have a cross-section of circular shape. However, the through hole 21 as well as the bolt 16 can have different cross-sections, for example of rectangular or square shape. The outer surface of the inner portion 20B has a cross-section that is generally of a truncated elliptical shape. In this example, the major axis of the elliptical shape of the cross-section of the outer surface of the inner portion 20B is perpendicular to the major axis of the elliptical shape of the cross-section of the inner surface of the outer portion 20A. Such a configuration makes it possible, thanks to the truncations of the elliptical shapes of the cross-sections, to easily form diametrically opposed connection devices 20C described below.

Figure 1B:
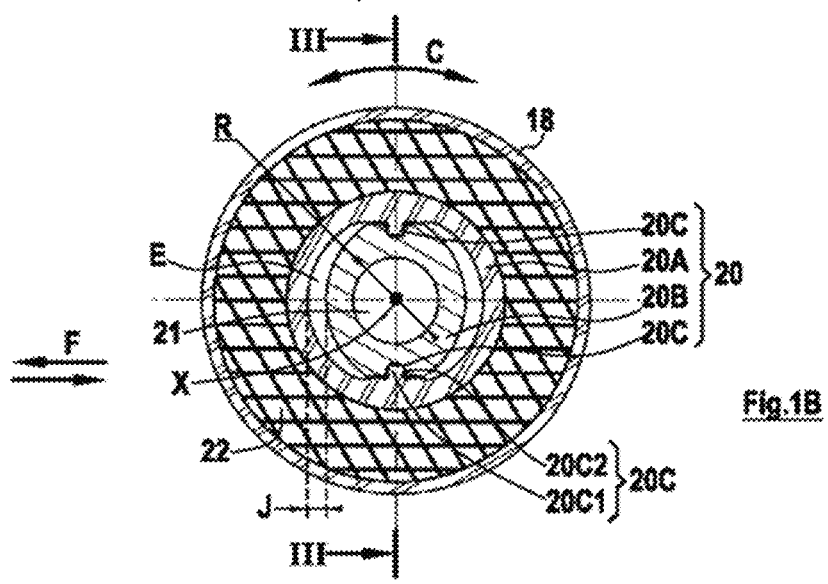
FIG. 1B shows a cross-sectional view according to line II of FIG. 1A of the suspension bearing ring for a motor vehicle.
Figure 1C:
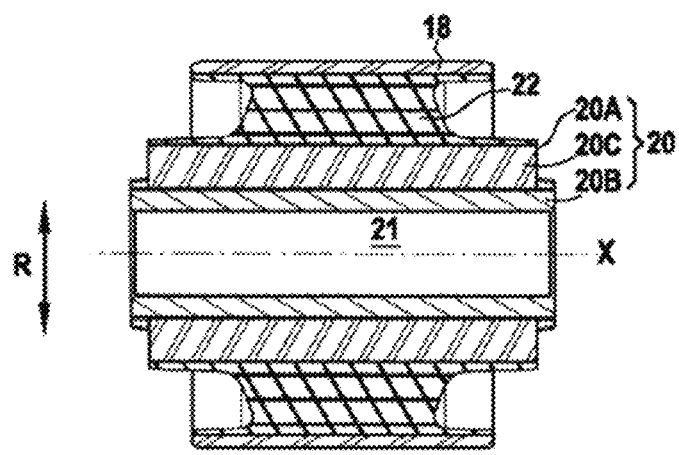
FIG. 1C shows a cross-sectional view according to line III of FIG. 1B of the suspension bearing ring for a motor vehicle.

As can be seen in FIG. 1B, the inner portion 20B is coupled with the outer portion 20A by means of two diametrically opposed connection devices 20C extending radially. In this example, the outer portion 20A and the inner portion 20B are formed by two distinct elements while every connection device 20C is formed by one rib 20C1 arranged on the outer portion 20A engaged in a groove 20C2 arranged on the inner portion 20B. To assemble the inner portion 20B together with outer portion 20A, so as to form inner part 20, the ribs 20C1 are engaged by force in the grooves 20C2 (e.g., by providing an evolutionary section of the groove and/or of the rib configured to generate sufficient blocking to maintain a force coupling of the inner portion to the outer portion). In this example, each rib 20C1 extends over the whole axial length of the outer portion 20A while each groove 20C2 extends over the whole axial length of the inner portion 20B.

The groove 20C1 of each of the connection devices 20C forms a fuse portion configured to break when the ring 10 is subjected to a predetermined force F. In this example, the predetermined force F is orientated perpendicular to the connection devices 20C, and more particularly in this example to the ribs 20C1 and grooves 20C2. It is noted that the force F can be orientated in either direction, according to the two arrows shown in FIG. 1B. A clearance J is provided between the outer portion 20A and the inner portion 20B. In this example, the clearance J is radial and perpendicular to the connection devices 20C. It is noted that in this example the degree of the clearance J is variable according to the azimuth. Particularly, in this example, when the fuse portion is intact (e.g. has not been broken), the clearance J is maximum in the direction parallel to the orientation of the predetermined force F, and zero in the direction perpendicular to the orientation of the predetermined force F.

The fuse portion of the connection device 20C is, in this example, formed by the groove 20C2. According to one variant, the fuse portion is formed by the rib 20C1, or by the rib 20C1 and by the groove 20C2. The fuse portion includes a predetermined breaking point such that either of the walls of the groove 20C2 breaks when a predetermined force F is applied to the ring 10. The predetermined breaking point can be adjusted in advance depending on the material, the shape, and the dimensions of the connection device 20C, and more particularly in this example of the groove 20C2, so that the connection device 20C breaks under the predetermined force F applied to the ring 10. In particular, the connection device 20C breaks if the inner part 20 is moved in relation to the outer part 18 by the predetermined force F. In this case, the elastomeric body 22 is completely compressed so that the inner part 20 can no longer move in relation to the outer part 18. In this case, in order to absorb the predetermined force F, the connection device 20C breaks. The breaking point is designed in such a way that the connection device 20C does not break under the forces acting on the ring 10 during normal use but breaks in a reliable manner under predetermined accidental loads likely to act on the ring 10.

In the event of the breakage of the connection device 20C, the clearance J permits a movement relative to the inner portion 20B in relation to the outer portion 20A. Nevertheless, the support function of the ring 10 is still intact, since the inner portion 20B is kept in the space E within the outer portion 20A. As a consequence, the inner portion 20B may always be kept within the outer portion 20A. The clearance J is planned so that a relative movement of the inner portion 20B is possible in relation to the outer portion 20A in the event of breakage of the connection device 20C. As a result of this movement of the inner portion 20B in relation to the outer portion 20A, a driver of the vehicle equipped with the ring 10 notices that the ring 10 has deteriorated, for example thanks to the noise generated when the inner portion 20B moves in relation to and bumps against the outer portion 20A. In particular, the clearance J is configured so that the movement of the inner portion 20B in relation to the outer portion 20A results in a detectable change in the behavior of the ring 10. In other words, clearance J is planned so that a driver of the vehicle equipped with the ring 10 notices that there is an abnormal clearance between the inner portion 20B and the outer portion 20A when the connection device 20C breaks.

Figure 2A:
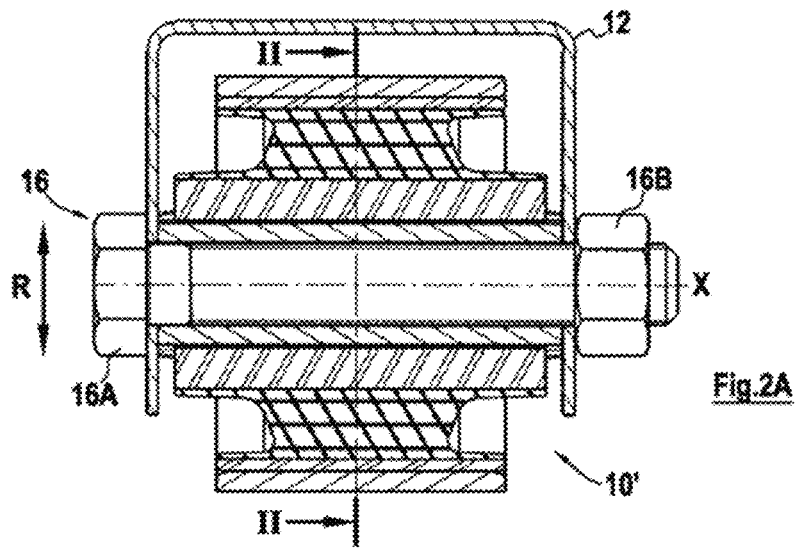
FIG. 2A shows a cross-sectional view of a suspension bearing for a motor vehicle according to a second embodiment.
Figure 2B:
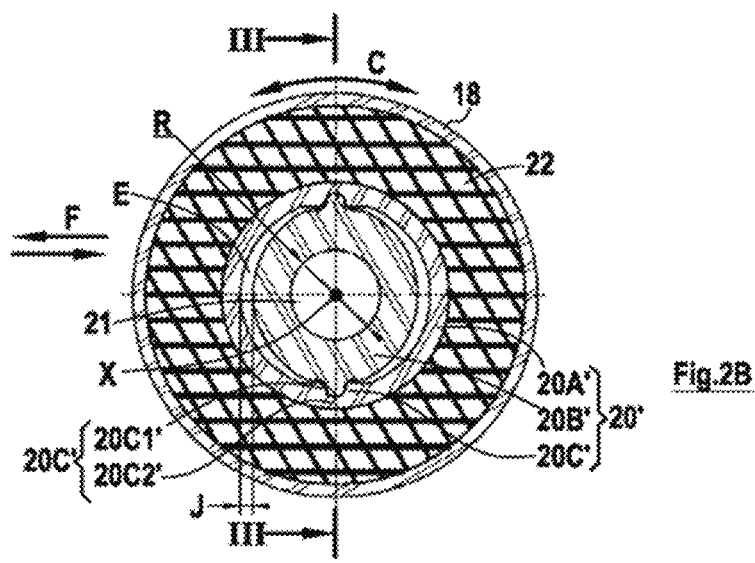
FIG. 2B shows a cross-sectional view according to line II of FIG. 2A of the suspension bearing ring for a motor vehicle.
Figure 2C:
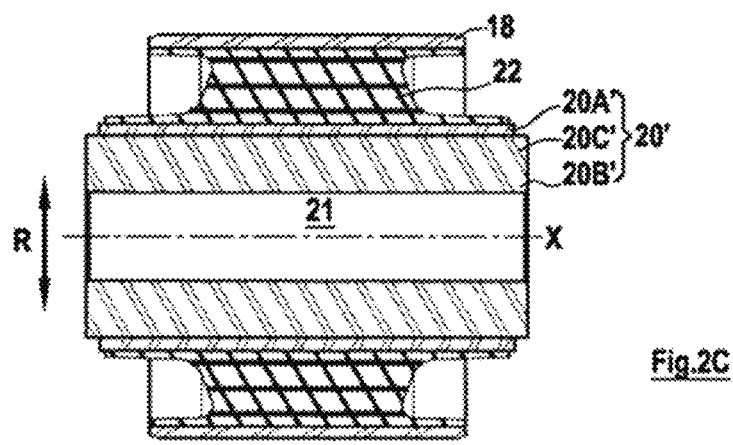
FIG. 2C shows a cross-sectional view according to line III of FIG. 2B of the suspension bearing ring for a motor vehicle.

A second embodiment of the suspension bearing ring 10' is described with reference to FIGS. 2A to 2C. The ring 10' according to the second embodiment is similar to the ring 10 according to the first embodiment with the exception of the inner part. Also, all the components common between the first and the second embodiment are not described again and keep the same reference sign while the different parts have their reference sign provided with a "'".

The inner portion 20B' of the second embodiment differs from the inner portion 20B of the first embodiment in that it is, for example, made of extruded aluminum, but not necessarily, and provided with a rib 20C1' in place of a groove. The outer portion 20A' of the second embodiment differs from the outer portion 20A of the first embodiment in that it is provided with a groove 20C2' in place of a rib. In other words, in the first embodiment, each connection device 20C comprises a rib 20C1 formed on the outer portion 20A and a groove 20C2 formed on the inner portion 20B while in the second embodiment, each connection device 20C' comprises a rib 20C 1' formed on the inner portion 20B' and a groove 20C2' formed on the outer portion 20A'. In this example, the fuse portion of each connection device 20C is formed by the rib 20C1'. According to one variant, the fuse portion is formed by the groove 20C2', or by the rib 20C 1' and by the groove 20C2'.

Figure 3A:
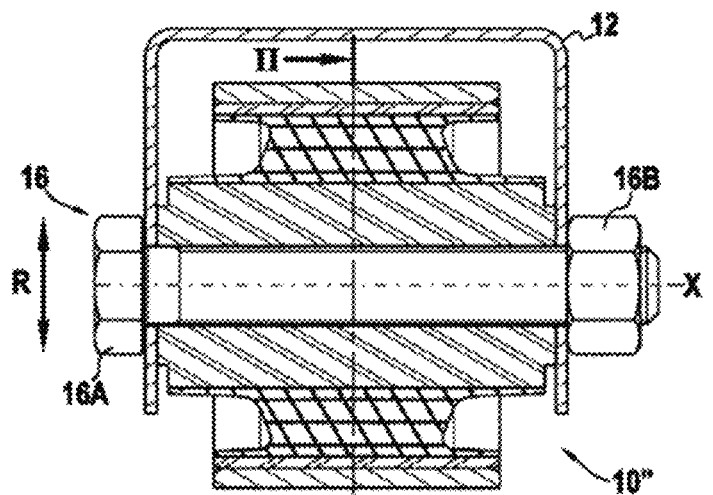
FIG. 3A shows a cross-sectional view of a suspension bearing for a motor vehicle according to a third embodiment.
Figure 3B:
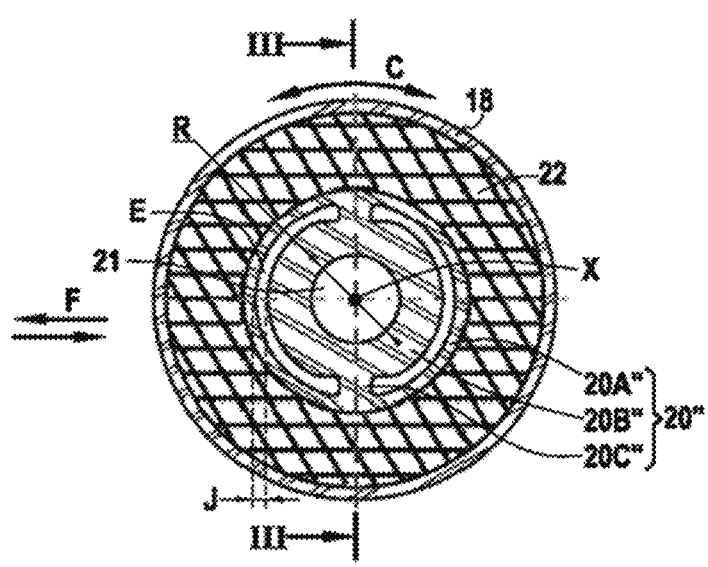
FIG. 3B shows a cross-sectional view according to line II of FIG. 3A of the suspension bearing ring for a motor vehicle.
Figure 3C:
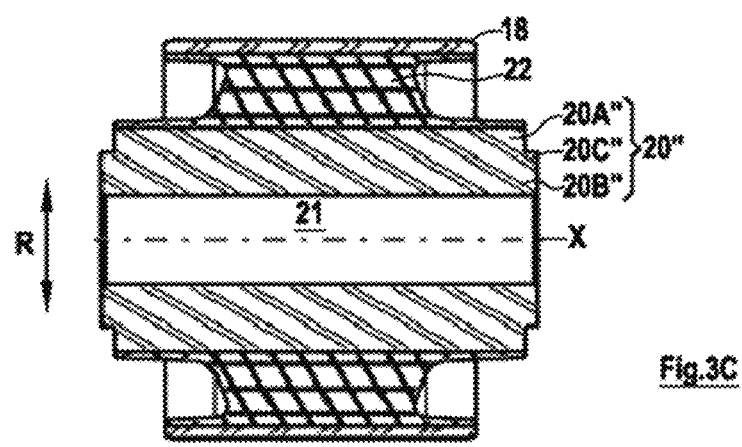
FIG. 3C shows a cross-sectional view according to line III of FIG. 3B of the suspension bearing ring for a motor vehicle.

A third embodiment of suspension bearing 10" is described with reference to FIGS. 3A to 3C. The ring 10" according to the third embodiment is similar to the rings 10 and 10' according to the first and second embodiments, with the exception of the inner part. Also, all of the components common between the first and second embodiments and the third embodiment are not described again and keep the same reference sign while the different parts see their reference sign provided with a """.

The inner part 20" is formed from a single element, for example made of extruded aluminum, but not necessarily. Also, unlike the first and second embodiments, the outer portion 20A" and the inner portion 20B" are not distinct elements. In other words, the outer portion 20A", the inner portion 20B", and the connection devices 20C" form one single part. In this example, the connection devices 20C" are each formed by a radial net, a radial rib, or a radial bridge, and extend in the axial direction X, with this radial net, rib, or bridge forming the fuse portion. In this example, the clearance J is radial and noticeably constant depending on the azimuth, except in the vicinity of the connection devices 20C".

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

What is claimed is:

1. A suspension bearing ring for a motor vehicle suspension, the suspension bearing ring comprising:
   an outer part,
   an inner part, and
   an elastomeric body connecting the inner part and the outer part,
   wherein the inner part includes an inner portion, an outer portion, and at least one connection device;
   the outer portion includes a through hole extending in an axial direction and is configured to receive a pivot link, the outer portion delimiting a space extending in the axial direction, and the inner portion extending axially wholly or partly in the space and being coupled to the outer portion via at the least one connection device;
   the at least one connection device includes a fuse portion configured to break when the ring is subjected to a predetermined force, and
   a clearance is provided between the inner portion and the outer portion so that the inner portion can move in relation to the outer portion when the fuse portion is broken.

2. The suspension bearing ring according to claim 1, wherein the inner part includes the at least one connection device; the at least one connection device includes a first connection device and a second connection device; the first connection device and the second connection device are diametrically opposed; the first connection device includes the fuse portion; and the second connection device includes a second fuse portion.

3. The suspension bearing ring according to claim 1, wherein the inner part is formed as one unitary element.

4. The suspension bearing ring according to claim 1, wherein the inner portion and the outer portion are distinct elements.

5. The suspension bearing ring according to claim 4, wherein the at least one connection device comprises an axial rib and an axial groove, a first element between the inner portion and the outer portion being provided with the rib while a second element between the inner portion and the outer portion is provided with the groove, the rib being engaged in the groove, and the rib and/or the groove forming the fuse portion.

6. The suspension bearing ring according to claim 1, wherein the predetermined force is orientated perpendicular to the axial direction.

7. The suspension bearing ring according to claim 1, wherein the inner portion and/or the outer portion are made of aluminum or of steel.

8. The suspension bearing ring according to claim 1, wherein the inner portion and/or the outer portion are extruded.

9. The suspension bearing ring according to claim 1, wherein the pivot link comprises a bolt or screw.

10. The suspension bearing ring according to claim 9, wherein the bolt or screw is stem threaded.

* * * * *